(12) United States Patent
Pan

(10) Patent No.: US 11,556,489 B2
(45) Date of Patent: Jan. 17, 2023

(54) SIGNAL CHANNEL SWITCHING METHOD, DISPLAY TERMINAL AND COMPUTER-READABLE STORAGE MEDIUM

(71) Applicant: SHENZHEN SKYWORTH-RGB ELECTRONIC CO., LTD., Shenzhen (CN)

(72) Inventor: Weixiong Pan, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 17/241,407

(22) Filed: Apr. 27, 2021

(65) Prior Publication Data

US 2021/0248101 A1  Aug. 12, 2021

Related U.S. Application Data

(63) Continuation of application No. PCT/CN2020/113859, filed on Sep. 8, 2020.

(30) Foreign Application Priority Data

Dec. 25, 2019  (CN) .......................... 201911358517.7

(51) Int. Cl.
  *G06F 13/40*   (2006.01)
(52) U.S. Cl.
  CPC ...... *G06F 13/4081* (2013.01); *G06F 13/4018* (2013.01); *G06F 13/4022* (2013.01)

(58) Field of Classification Search
  CPC ............. G06F 13/4081; G06F 13/4018; G06F 13/4022; G06F 13/126; G06F 3/1438;
  (Continued)

(56) References Cited

U.S. PATENT DOCUMENTS 6,223,283 B1   4/2001   Chaiken et al.
8,478,914 B2   7/2013   Sato et al.
(Continued)

FOREIGN PATENT DOCUMENTS

CN         1836441 A     9/2006
CN       101282443 A    10/2008
(Continued)

OTHER PUBLICATIONS

First Office Action in counterpart Chinese Patent Application No. 201911358517.7, dated Feb. 13, 2020.
(Continued)

*Primary Examiner* — Faisal M Zaman
(74) *Attorney, Agent, or Firm* — Westbridge IP LLC

(57) ABSTRACT

The present application discloses a signal channel switching method, a display terminal and a computer-readable storage medium. The signal channel switching method includes the following operations: establishing a data connection with a first external device connected with a first hot plug pin; obtaining a first voltage detected by a second hot plug pin, and judging whether the first voltage conforms to a preset rule; if the first voltage conforms to the preset rule, obtaining information of a second external device connected with the second hot plug pin; cutting off the data connection with the first external device and establishing a data connection with the second external device according to the information of the second external device.

16 Claims, 5 Drawing Sheets

(58) Field of Classification Search
CPC .............. G09G 2340/04; G09G 5/006; G09G 2370/042; G09G 2370/12; H04N 5/268; H04N 21/43635; H04N 21/4122; H04N 21/4622; H04N 21/43072
USPC ....... 345/204; 375/240.01, 7.012; 348/7.085, 348/705, 5.002; 725/131, 100, 105, 139
See application file for complete search history.

(56) References Cited

U.S. PATENT DOCUMENTS

| | | | |
|---|---|---|---|
| 11,151,070 B2* | 10/2021 | Lection | G06F 13/4286 |
| 2005/0190916 A1* | 9/2005 | Sedacca | H04N 21/4405 |
| | | | 380/239 |
| 2006/0071921 A1* | 4/2006 | Park | H04N 21/4363 |
| | | | 345/204 |
| 2008/0134237 A1* | 6/2008 | Tu | H04N 7/1675 |
| | | | 725/38 |
| 2008/0222438 A1 | 9/2008 | Lin et al. | |
| 2009/0251606 A1* | 10/2009 | Tokoro | G09G 5/006 |
| | | | 348/554 |
| 2010/0090849 A1* | 4/2010 | Suga | H04N 21/43635 |
| | | | 340/653 |
| 2011/0129229 A1* | 6/2011 | Schemmann | H04B 10/807 |
| | | | 398/141 |
| 2011/0148672 A1* | 6/2011 | Ventura Domingo | G06F 1/3278 |
| | | | 713/320 |
| 2011/0273805 A1* | 11/2011 | Nguyen | H04N 5/765 |
| | | | 361/87 |
| 2011/0283129 A1* | 11/2011 | Guillerm | H04N 21/42204 |
| | | | 713/340 |
| 2012/0229653 A1* | 9/2012 | Lien | H04N 17/004 |
| | | | 348/192 |
| 2012/0327250 A1* | 12/2012 | Zhang | G09G 5/006 |
| | | | 348/180 |
| 2013/0103861 A1* | 4/2013 | Ahn | H04W 52/0261 |
| | | | 710/14 |
| 2014/0043538 A1* | 2/2014 | Wang | H04N 5/775 |
| | | | 348/E5.062 |
| 2014/0325554 A1* | 10/2014 | Park | G06F 21/10 |
| | | | 725/31 |
| 2015/0378413 A1* | 12/2015 | Tomoda | H04N 21/43635 |
| | | | 713/340 |
| 2016/0323554 A1 | 11/2016 | Oh | |
| 2017/0132749 A1* | 5/2017 | Lim | G06F 13/4068 |
| 2017/0139456 A1* | 5/2017 | Alou | G09G 5/006 |
| 2018/0070137 A1* | 3/2018 | Kao | G09G 5/00 |
| 2018/0190237 A1* | 7/2018 | Li | G09G 5/006 |
| 2019/0018465 A1* | 1/2019 | Whitby-Strevens | G06F 1/28 |
| 2019/0116321 A1* | 4/2019 | Grimm | H04N 21/43635 |
| 2019/0348010 A1* | 11/2019 | Oh | G09G 5/006 |
| 2020/0105177 A1* | 4/2020 | Choi | G09G 5/005 |
| 2020/0184921 A1* | 6/2020 | Yong | G06F 3/1423 |
| 2022/0130702 A1* | 4/2022 | Kawawa | G01B 7/003 |
| 2022/0158814 A1* | 5/2022 | Yu | H04B 10/25 |
| 2022/0158999 A1* | 5/2022 | Kaidi | H04L 63/1483 |

FOREIGN PATENT DOCUMENTS

| | | |
|---|---|---|
| CN | 101369259 A | 2/2009 |
| CN | 101466007 A | 6/2009 |
| CN | 103139519 A | 6/2013 |
| CN | 103686369 A | 3/2014 |
| CN | 104103924 A | 10/2014 |
| CN | 104704445 A | 6/2015 |
| CN | 105808488 A | 7/2016 |
| CN | 105931589 A | 9/2016 |
| CN | 106374751 A | 2/2017 |
| CN | 107678991 A | 2/2018 |
| CN | 108055481 A | 5/2018 |
| CN | 110769308 A | 2/2020 |

OTHER PUBLICATIONS

Fourth Office Action in counterpart Chinese Patent Application No. 201911358517.7, dated Sep. 30, 2020.
International Search Report in corresponding PCT Application No. PCT/CN2020/113859, dated Dec. 9, 2020.
Second Office Action in counterpart Chinese Patent Application No. 201911358517.7, dated Mar. 13, 2020.
Third Office Action in counterpart Chinese Patent Application No. 201911358517.7, dated Apr. 1, 2020.
Written Opinion in corresponding PCT Application No. PCT/CN2020/113859, dated Dec. 9, 2020.
Zhuang, Electronic Design Reliability Engineering, Sep. 30, 2014, pp. 327-331, Xi'an Electronic University of Science and Technology Press, Xi'an, China.
Examination Report issued in counterpart Indian Patent Application No. 202127022200, dated Aug. 3, 2022.
Extended European Search Report issued in counterpart European Patent Application No. 20906128.2, dated Aug. 26, 2022.

* cited by examiner

SIGNAL CHANNEL SWITCHING METHOD, DISPLAY TERMINAL AND COMPUTER-READABLE STORAGE MEDIUM

CROSS-REFERENCE TO RELATED APPLICATIONS

This application is a continuation application of PCT application No. PCT/CN2020/113859 filed on Sep. 8, 2020, which claims priority to Chinese Patent Application No. 201911358517.7, filed on Dec. 25, 2019, entitled "Signal Channel Switching Method, Display Terminal and Storage Medium". The disclosures of the aforementioned applications are hereby incorporated by reference in their entireties.

TECHNICAL FIELD

The present disclosure relates to the technical field of television, in particular to a signal channel switching method, a display terminal and a computer-readable storage medium.

BACKGROUND

At present, with the continuous improvement and development of TV technology, Home TV has a plurality of high definition multimedia (HDMI) ports for connecting a plurality of external devices. When the external devices are powered on, the user selects and switches to each HDMI source channel through remote control keys to control to access a port. Due to the large number of connected external devices, the manual switching of source channels by the user is complicated and the user experience is poor.

Therefore, it is necessary to provide a signal channel switching method to solve the above technical problems.

The above content is only used to assist in understanding the technical scheme of this application and does not mean that the above content is recognized as prior art.

SUMMARY

The main objective of the present application is to provide a signal channel switching method, a display terminal and a storage medium, aiming at solving the technical problem that the display terminal cannot automatically switch signal channels.

In order to achieve the above objective, the present application provides a signal channel switching method, including:

establishing a data connection with a first external device connected to a first hot plug pin;

obtaining a first voltage detected by a second hot plug pin, and judging whether the first voltage conforms to a preset rule;

if the first voltage conforms to the preset rule, obtaining information of a second external device connected with the second hot plug pin; and cutting off the data connection with the first external device and establishing a data connection with the second external device according to the information of the second external device;

In one embodiment, the operation of obtaining a first voltage detected by a second hot plug pin, and judging whether the first voltage conforms to a preset rule includes:

obtaining the first voltage detected by the second hot plug pin and judging whether the first voltage is higher than a first preset voltage; and if the first voltage is higher than the first preset voltage, recording a duration of the first voltage and judging whether the duration is greater than a preset time;

the operation of if the first voltage conforms to the preset rule, obtaining information of a second external device connected with the second hot plug pin includes:

if the duration is greater than the preset time, obtaining the information of the second external device connected with the second hot plug pin.

In one embodiment, after the operation of if the first voltage conforms to the preset rule, obtaining information of a second external device connected to the second hot plug pin, the method includes:

obtaining user setting information, and judging whether a signal channel switching is allowed according to the user setting information; and if the signal channel switching is allowed, executing the operation of cutting off the data connection with the first external device and establishing a data connection with the second external device according to the information of the second external device.

In one embodiment, prior to the operation of cutting off the data connection with the first external device and establishing a data connection with the second external device according to the information of the second external device, the method further includes:

judging priority orders of the first external device and the second external device according to a pre-stored priority table; and if the second external device takes precedence over the first external device, performing the operation of cutting off the data connection with the first external device and establishing a data connection with the second external device according to the information of the second external device.

In one embodiment, the information of the second external device includes extended display identification data (EDID) information, and the operation of if the first voltage conforms to a preset rule, obtaining information of a second external device connected with the second hot plug pin includes:

if the first voltage conforms to the preset rule, obtaining the EDID information of the second external device connected with the second hot plug pin;

analyzing the EDID information and judging whether the EDID information matches pre-read EDID information; and if the EDID information matches the pre-read EDID information, executing the operation of cutting off the data connection with the first external device and establishing a data connection with the second external device according to the information of the second external device.

In one embodiment, after the operation of cutting off the data connection with the first external device and establishing a data connection with the second external device according to the information of the second external device includes:

receiving display information sent by the second external device;

determining an optimization rule corresponding to the information of the second external device; and decoding the display information according to the optimization rule to generate an optimized display picture.

In one embodiment, the operation of decoding the display information according to the optimization rule to generate an optimized display picture includes:

obtaining a second voltage detected by a third hot plug pin, and judging whether the second voltage conforms to the preset rule;

if the second voltage conforms to the preset rule, obtaining information of a third external device connected with the third hot plug pin; and cutting off the data connection with the second external device and establishing a data connection with the third external device according to the information of the third external device.

In one embodiment, after the operation of cutting off the data connection with the second external device and establishing a data connection with the third external device according to the information of the third external device, the method further includes:

receiving an external device switching command sent by a user; and establishing a data connection with an external device corresponding to the external device switching command.

In order to achieve the above objective, the present application also provides a display terminal including a memory, a processor, and a computer program stored on the memory and executable by the processor, when the processor executes the program, the operations of the signal channel switching method as described above are realized.

In order to achieve the above objective, the present application also provides a storage medium on which a computer program is stored, when the computer program is executed by a processor, the operations of the signal channel switching method as described above are realized.

The application relates to a signal channel switching method, a terminal and a storage medium proposed by the embodiments of the present application, which establishes a data connection with a first external device connected with a first hot plug pin, obtains a first voltage detected by a second hot plug pin, and judges whether the first voltage conforms to a preset rule, acquires information of a second external device connected with the second hot plug pin if the first voltage conforms to a preset rule, cuts off the data connection with the first external device and establishes a data connection with the second external device according to the information of the second external device. Therefore, the display terminal automatically switches the signal channels to connect with external devices, and the use experience of users is improved.

The realization of the objectives, functional features and advantages of the present application will be further explained combining with embodiments and with reference to the accompanying drawings.

DETAILED DESCRIPTION OF THE EMBODIMENTS

The technical solutions of the embodiments of the present disclosure will be described in more detail below with reference to the accompanying drawings. It should be understood that the specific embodiments described herein are intended for illustration only and are not intended for limiting the present application. All other embodiments obtained by persons skilled in the art based on the embodiments of the present disclosure without creative efforts shall fall within the scope of the present disclosure.

Embodiments of the present application provide a signal channel switching method, a display terminal and a storage medium.

Figure 1:
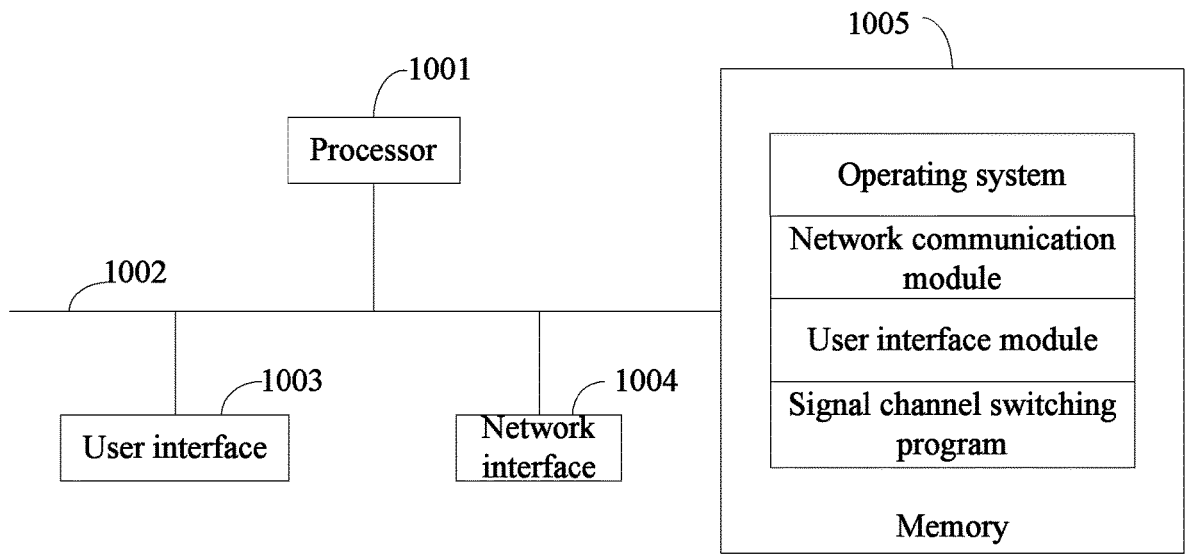
FIG. 1 is a schematic diagram of a structure of a display terminal of a hardware running environment involved in an embodiment of the present application.

As shown in FIG. 1, the method of the present application is applicable to a display terminal, which includes, but not limit to, a tablet, a computer, a television, or the like. The display terminal may include a processor 1001 such as a CPU, a communication bus 1002, a user interface 1003, a network interface 1004, and a memory 1005. Among them, the communication bus 1002 is used to implement connection and communication between those components. The user interface 1003 can include a touch panel, a touch screen, a keyboard, and the user interface 1003 can optionally also include a standard wired interface, and a wireless interface. The network interface 1004 can optionally include a standard wired interface, and a wireless interface (e.g., a Wi-Fi interface). The memory 1005 can be a high-speed RAM memory or a non-volatile memory, such as a magnetic disk memory. The memory 1005 can optionally also be a storage device independent of the aforementioned processor 1001.

Optionally, the display terminal can also include a RF (Radio Frequency) circuit, an audio circuit, a Wi-Fi module, and the like. Of course, the display terminal can also be equipped with a gyroscope, a barometer, a hygrometer, a thermometer and other sensors, which will not be repeated here.

As will be appreciate by those skilled in that art, the structure of the display terminal illustrated in FIG. 1 does not constitute a limitation of the display terminal, which may include more or fewer components than shown, or a combination of certain components, or a different arrangement of components.

As shown in FIG. 1, a memory 1005 as a computer storage medium can include an operating system, a network communication module, a user interface module, and a signal channel switching program.

In the display terminal shown in FIG. 1, the processor 1001 can be used to invoke the signal channel switching program stored in the memory 1005 and perform the following operations:

establishing a data connection with a first external device connected to a first hot plug pin;

obtaining a first voltage detected by a second hot plug pin, and judging whether the first voltage conforms to a preset rule;

if the first voltage conforms to the preset rule, obtaining information of a second external device connected with the second hot plug pin; and cutting off the data connection with the first external device and establishing a data connection with the second external device according to the information of the second external device.

Further, the processor 1001 can invoke the signal channel switching program stored in the memory 1005 and also perform the following operations:

obtaining the first voltage detected by the second hot plug pin and judging whether the first voltage is higher than a first preset voltage;

if the first voltage is higher than the first preset voltage, recording a duration of the first voltage and judging whether the duration is greater than a preset time; and the operation of if the first voltage conforms to the preset rule, obtaining information of a second external device connected with the second hot plug pin includes the following operations:

if the duration is greater than the preset time, obtaining the information of the second external device connected with the second hot plug pin.

Further, the processor 1001 can invoke the signal channel switching program stored in the memory 1005 and also perform the following operations:

obtaining user setting information, and judging whether a signal channel switching is allowed according to the user setting information; and if the signal channel switching is allowed, executing the operation of cutting off the data connection with the first external device and establishing a data connection with the second external device according to the information of the second external device.

Further, the processor 1001 can invoke the signal channel switching program stored in the memory 1005 and also perform the following operations:

judging priority orders of the first external device and the second external device according to a pre-stored priority table; and if the second external device takes precedence over the first external device, executing the operation of cutting off the data connection with the first external device and establishing a data connection with the second external device according to the information of the information of the second external device.

Further, the processor 1001 can invoke the signal channel switching program stored in the memory 1005 and also perform the following operations:

if the first voltage conforms to the preset rule, obtaining EDID information of the second external device connected with the second hot plug pin;

analyzing the EDID information and judging whether the EDID information matches pre-read EDID information; and if the EDID information matches the pre-read EDID information, executing the operation of cutting off the data connection with the first external device and establishing a data connection with the second external device according to the information of the second external device.

Further, the processor 1001 can invoke the signal channel switching program stored in the memory 1005 and also perform the following operations:

receiving display information sent by the second external device;

determining an optimization rule corresponding to the EDID information; and decoding the display information according to the optimization rule to generate an optimized display picture.

Further, the processor 1001 can invoke the signal channel switching program stored in the memory 1005 and also perform the following operations:

obtaining a second voltage detected by a third hot plug pin, and judging whether the second voltage conforms to the preset rule;

if the second voltage conforms to the preset rule, obtaining information of a third external device connected with the third hot plug pin; and cutting off the data connection with the second external device and establishing a data connection with the third external device according to the information of the third external device.

Further, the processor 1001 can invoke the signal channel switching program stored in the memory 1005 and also perform the following operations:

receiving an external device switching command sent by a user; and establishing a data connection with an external device corresponding to the external device switching command.

Based on the above hardware structure, various embodiments of the signal channel switching method in the present application are proposed.

Figure 2:
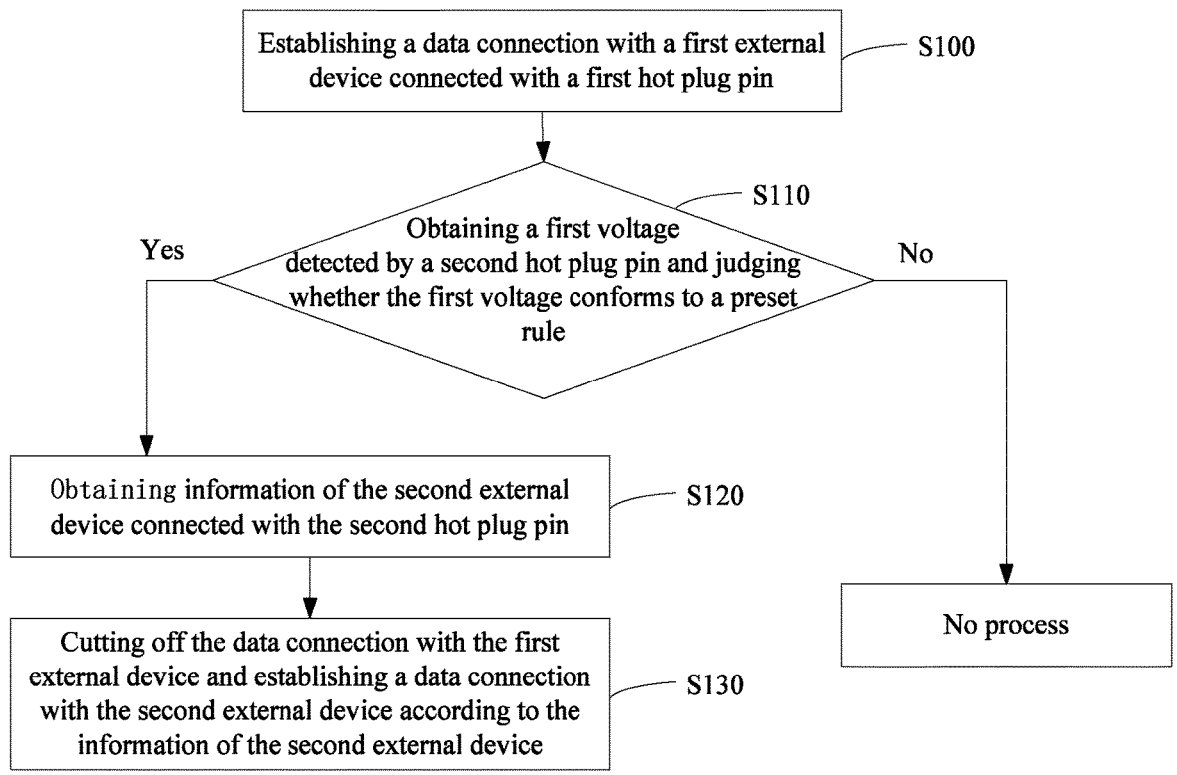
FIG. 2 is a flow diagram of a first embodiment of a signal channel switching method of the present application.

Referring to FIG. 2, a first embodiment of the present application provides a signal channel switching method, the signal channel switching method includes:

Operation S100, establishing a data connection with a first external device connected with a first hot plug pin.

In this embodiment, the first hot plug pin is a hot plug pin of a high definition multimedia (HDMI) interface of a display terminal, and the first external device is connected to the display terminal through an HDMI wire.

Optionally, the data connection established between the display terminal and the first external device may be that the display terminal reads extended display identification data (EDID) information stored in a memory of the first external device through a data channel in the HDMI, when it is detected that the EDID information matches pre-read EDID information in the display terminal, a data connection is established with the first external device, and the display terminal receives digital signals sent by the first external device and displays.

Operation S110, obtaining a first voltage detected by a second hot plug pin and judging whether the first voltage conforms to a preset rule;

Operation S120, if the first voltage conforms to the preset rule, obtaining information of the second external device connected with the second hot plug pin; and if the first voltage does not conform to the preset rule, no processing is performed.

In this embodiment, the second hot plug pin is a hot plug pin of another HDMI interface of the display terminal. When the second hot plug pin detects a first voltage, and the first voltage conforms to a preset rule, it indicates that the another HDMI interface of the display terminal is connected to a second external device. The display terminal acquires information of the second external device stored in the memory of the second external device through a data channel in the HDMI, and the information of the second external device includes EDID information of the second external device.

Further, the preset rule can be first judging whether the first voltage reaches a preset voltage, and then judging whether a duration of the first voltage is greater than a preset time if the first voltage reaches the preset voltage, for example, judging whether the first voltage reaches 2 V, and judging whether the duration of the first voltage is greater than 100 ms if the first voltage reaches 2 V.

When the second external device is hot-plugged with the display terminal, mechanical contacts of the HDMI interface bounce at the moment of contacting with an HDMI wire plug, causing voltage oscillation. Therefore, a delay start circuit can be preset in the display terminal. When the HDMI interface of the display terminal is connected with a plug, the power-on of the HDMI interface is delayed, hardware damage that may be caused by voltage oscillation is prevented, and the display terminal establishes a data connection with the second external device only when the duration of the first voltage is greater than the preset time.

Operation S130, cutting off the data connection with the first external device and establishing a data connection with the second external device according to the information of the second external device.

In this embodiment, when it is detected that after the first external device is connected to the display terminal, the second external device is also connected to the display terminal, and the first voltage obtained by the second external device through hot plug detection conforms to the preset rule, the display terminal cuts off the data connection with the first external device and establishes a data connection with the second external device, thus realizing automatic switching of signal channels to connect with external devices and improving the experience of users.

Figure 3:
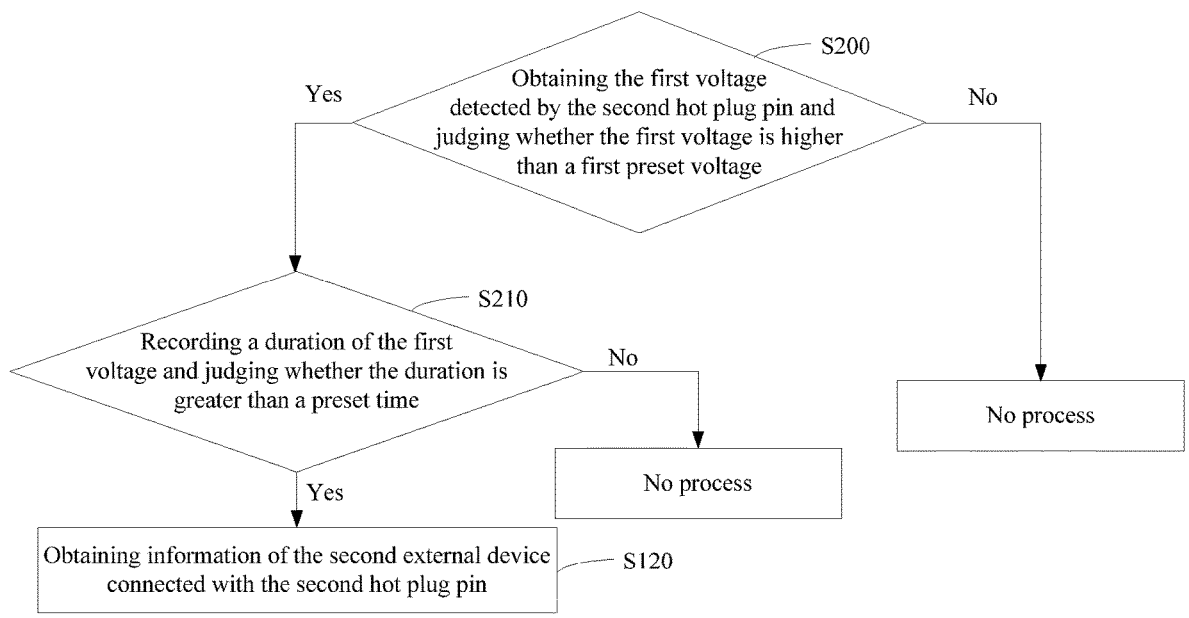
FIG. 3 is a detailed flow diagram of operation S110 in a second embodiment of the signal channel switching method of the present application.

Further, a second embodiment is proposed based on the first embodiment. Referring to FIG. 3, FIG. 3 is a detailed flow diagram of Operation S110 of the signal channel switching method shown in FIG. 2. In this embodiment, Operation S110 includes:

Operation 200, obtaining the first voltage detected by the second hot plug pin and judging whether the first voltage is higher than a first preset voltage.

In this embodiment, the first preset voltage should be set to be small, and optionally, the first preset voltage can be set to be 2 V.

Optionally, a voltage range may be preset and it judges whether the first voltage is within the voltage range. For example, it judges whether the first voltage is not less than 2 V and not greater than 5 V, when the first voltage is higher than 5 V, the first voltage may be too high due to a power supply failure, and the display terminal is not to be connected with the second external device to prevent circuit damage due to the too high first voltage, when the first voltage is lower than 2 V, the voltage is too low at this time, and the low voltage in circuits will cause the display terminal to fail to operate normally, thus the display terminal does not establish a data connection with the second external device.

Operation S210, if the first voltage is higher than the first preset voltage, recording a duration of the first voltage and judging whether the duration is greater than a preset time;

if the first voltage is not higher than the first preset voltage, no processing is performed; and if the duration is greater than the preset time, executing Operation S120.

That is, Operation S120 specifically includes:

if the duration is greater than the preset time, obtaining information of the second external device connected with the second hot plug pin; and if the duration is not greater than the preset time, no processing is performed.

In this embodiment, when the first voltage is greater than the first preset voltage, it judges whether a duration of the first voltage is greater than a preset time. Since voltage oscillation will occur at the moment the second external device is connected to the display terminal, it should be confirmed the stability of the first voltage at this time, that is, it tries to establish a data connection with the second external device after the duration of the first voltage is greater than the preset time.

In this embodiment, only when the first voltage conforms to the preset rule will the display terminal attempt to connect with the second external device. By setting the preset rule, the display terminal can be normally connected with the second external device.

Figure 4:
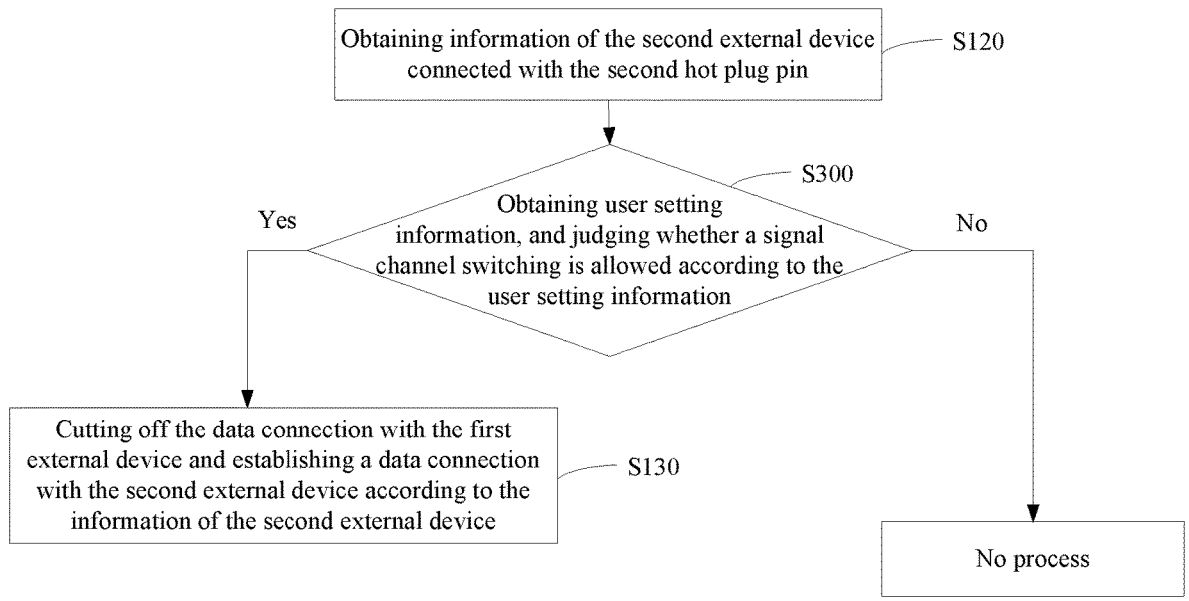
FIG. 4 is a flow diagram of a third embodiment of the signal channel switching method of the present application.

Further, a third embodiment is proposed based on the first embodiment. Referring to FIG. 4, in this embodiment, after Operation S120, the method includes:

Operation S300, obtaining user setting information, and judging whether a signal channel switching is allowed according to the user setting information.

In this embodiment, the user setting information is generated according to settings of the display terminal by the user using software, which can be stored in the memory of the display terminal. The user setting information can be specifically related to whether a signal channel switching is allowed or not. Optionally, a signal channel control software can be pre-installed in the display terminal, and the user can open the signal channel control software through a remote controller and carry out a setting.

If the signal channel switching is allowed, Operation S130 is executed.

If signal channel switching is not allowed, no processing is performed.

In this embodiment, the user can choose whether to allow a signal channel switching. When it is not allowed, that is, the user selects to turn off the function of automatically switching signal channels of the display terminal. Optionally, the user can also select one or several HDMI interfaces of the display terminal through the signal channel control software to allow signal channel switching, while others not to allow signal channel switching. The user can set according to his personal preferences, thus being freer and more convenient to use.

Figure 5:
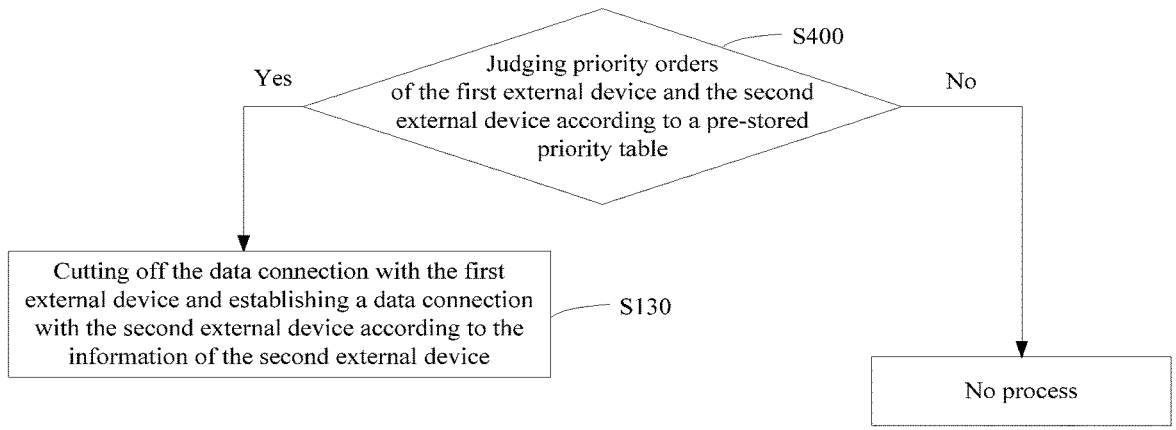
FIG. 5 is a flow diagram of a fourth embodiment of the signal channel switching method of the present application.

Further, a fourth embodiment is proposed based on the first embodiment. Referring to FIG. 5, in this embodiment, Operation S130 is preceded by:

Operation S400, judging priority orders of the first external device and the second external device according to a pre-stored priority table;

if the second external device takes precedence over the first external device, executing Operation S130; and if the first external device takes precedence over the second external device, no processing is performed.

In this embodiment, a pre-stored priority table can be generated and stored in the display terminal according to the settings of the user. Specifically, the user can view device names of the first external device and the second external device according to the acquired EDID information. When the first external device and the second external device are both connected to the display terminal (e.g., when the display terminal is powered on, both the first external device and the second external device are connected to the display terminal), the user can set which external device the display terminal establishes a data connection with. For example, if the user sets the display terminal to establish a data connection with the second external device, the processor of the display terminal determines that a priority of the second external device is higher than that of the first external device, and generates the pre-stored priority table and stores the pre-stored priority table.

Further, the user may not set the pre-stored priority table, and when the pre-stored priority table does not exist in the display terminal, the establishing way of data connections between the display terminal and the first external device and the second external device is to automatically switch a signal channel connection.

In this embodiment, by setting a pre-stored priority table, the user is allowed to set a connection sequence of external devices, thus increasing the operability of the user.

Figure 6:
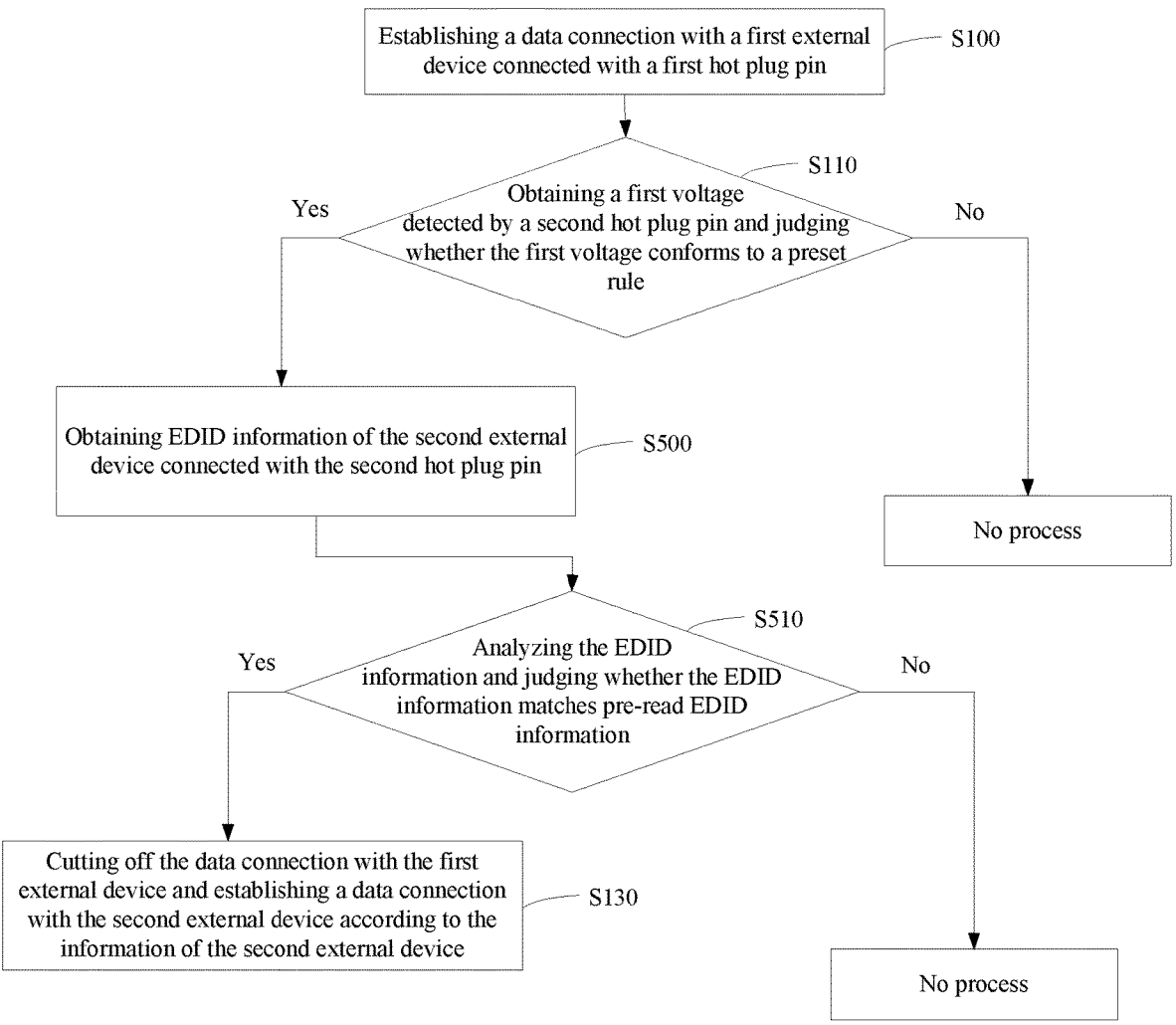
FIG. 6 is a detailed flow diagram of operation S120 in a fifth embodiment of the signal channel switching method of the present application.

Further, a fifth embodiment is proposed based on the first embodiment. Referring to FIG. 6, FIG. 6 is a detailed flow diagram of Operation S120 of the signal channel switching method of the present application of FIG. 5. In this embodiment, Operation S120 includes:

Operation S500, if the first voltage conforms to the preset rule, obtaining EDID information of the second external device connected with the second hot plug pin; and Operation S510, analyzing the EDID information and judging whether the EDID information matches pre-read EDID information.

In this embodiment, the EDID information is the extended display identification data (EDID) information of the second external device. The EDID information includes supplier information, maximum image size, color setting, manufacturer preset information, and etc. of the second external device. The pre-read EDID information is preset in the display terminal when leaving the factory, and the display terminal can only be connected with those external devices matching the pre-read EDID information.

If the EDID information matches the pre-read EDID information, Operation S130 is executed; and if the EDID information does not match the pre-read EDID information, no processing is performed.

In this embodiment, when the EDID information matching the pre-read EDID information, the second external device establishes a data connection with the display terminal, thereby avoiding pictures not being displayed on the display terminal or there existing problems related to picture displaying caused by EDID mismatching.

Figure 7:
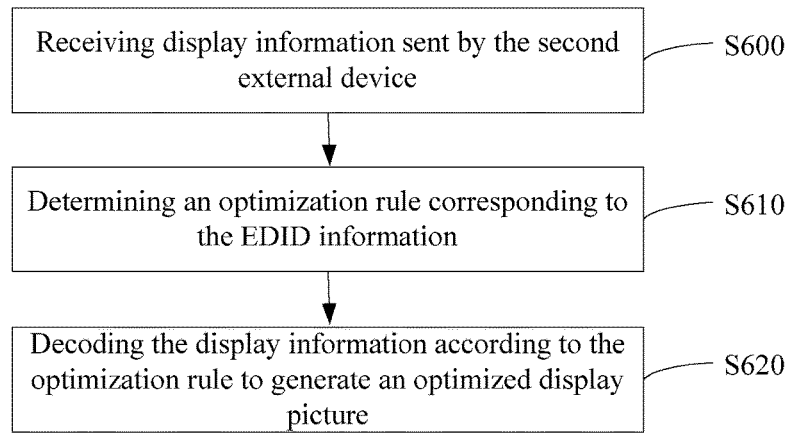
FIG. 7 is a flow diagram of a sixth embodiment of the signal channel switching method of the present application.

Further, a sixth embodiment is proposed based on the fifth embodiment. Referring to FIG. 7, in this embodiment, if the EDID information matches the pre-read EDID information, after Operation S130, the method includes:

Operation S600, receiving display information sent by the second external device;

Operation S610, determining an optimization rule corresponding to the EDID information;

Operation S620, decoding the display information according to the optimization rule to generate an optimized display picture.

In this embodiment, the display information transmitted by the second external device includes a digital signal transmitted by the second external device. After the display terminal acquires the EDID information of the second external device, it obtains an optimization rule corresponding to the EDID information. The optimization rule is obtained by testing before the display terminal leaves the factory. A mapping table of optimization rules and EDID information is established and stored in the memory of the display terminal. After decoding the digital signal, the optimization rule is used to optimize video resolution information, color information and the like obtained after decoding the digital signal to generate an optimized display picture and display the optimized display picture. In this solution, the optimized display picture is obtained through presetting the optimization rule, thus improving the viewing experience of users.

Figure 8:
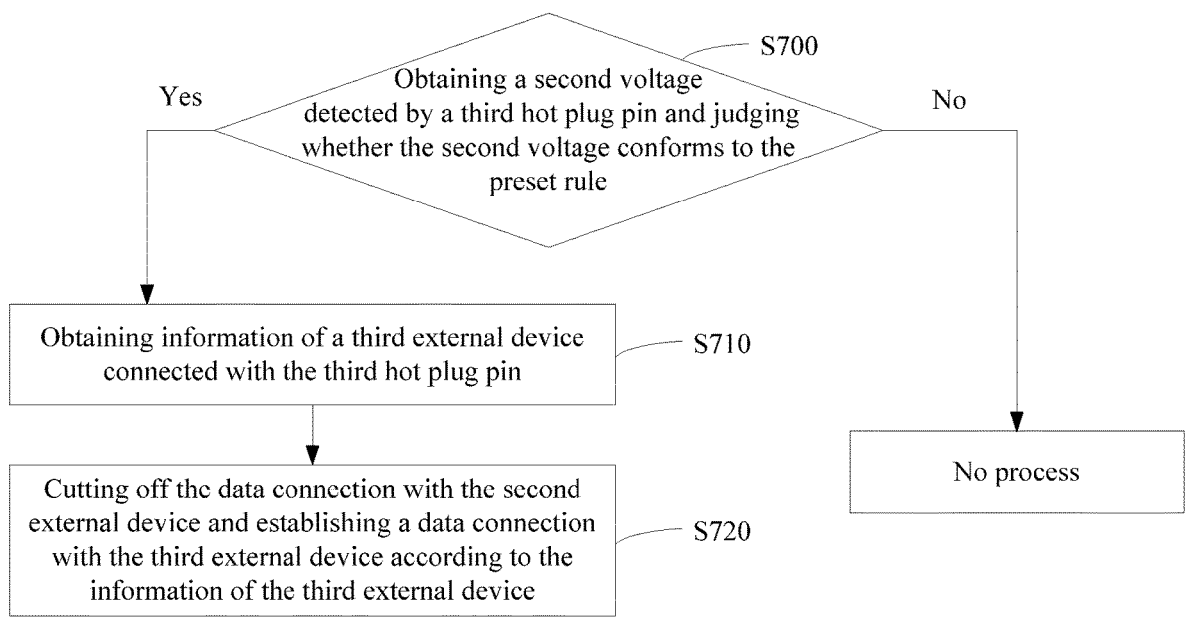
FIG. 8 is a flow diagram of a seventh embodiment of the signal channel switching method of the present application.

Further, a seventh embodiment is proposed based on the sixth embodiment. Referring to FIG. 8, in this embodiment, after Operation S620, the method includes:

Operation S700, obtaining a second voltage detected by a third hot plug pin and judging whether the second voltage conforms to the preset rule;

Operation S710, if the second voltage conforms to the preset rule, obtaining information of a third external device connected with the third hot plug pin;

if the second voltage does not conform to the preset rule, no processing is performed; and Operation S720, cutting off the data connection with the second external device and establishing a data connection with the third external device according to the information of the third external device.

In this embodiment, when a third external device is connected to the display terminal, if the third external device satisfies a connection requirement, the display terminal cuts off the previously established connection with the second external device and establishing a data connection with the third external device.

Further, when the display terminal automatically establishes data connections with a plurality of external devices, and the plurality of external devices are connected with the display terminal at different times, the display terminal establishes a data connection with the last connected external device each time.

In this embodiment, when a user is faced with a plurality of external devices to be connected with the display terminal, the user only needs to connect the external device that the user wants with the display terminal at last to realize automatic switching of signal channels of the display terminal, which is convenient and rapid.

Further, an eighth embodiment is proposed based on the seventh embodiment.

Figure 9:
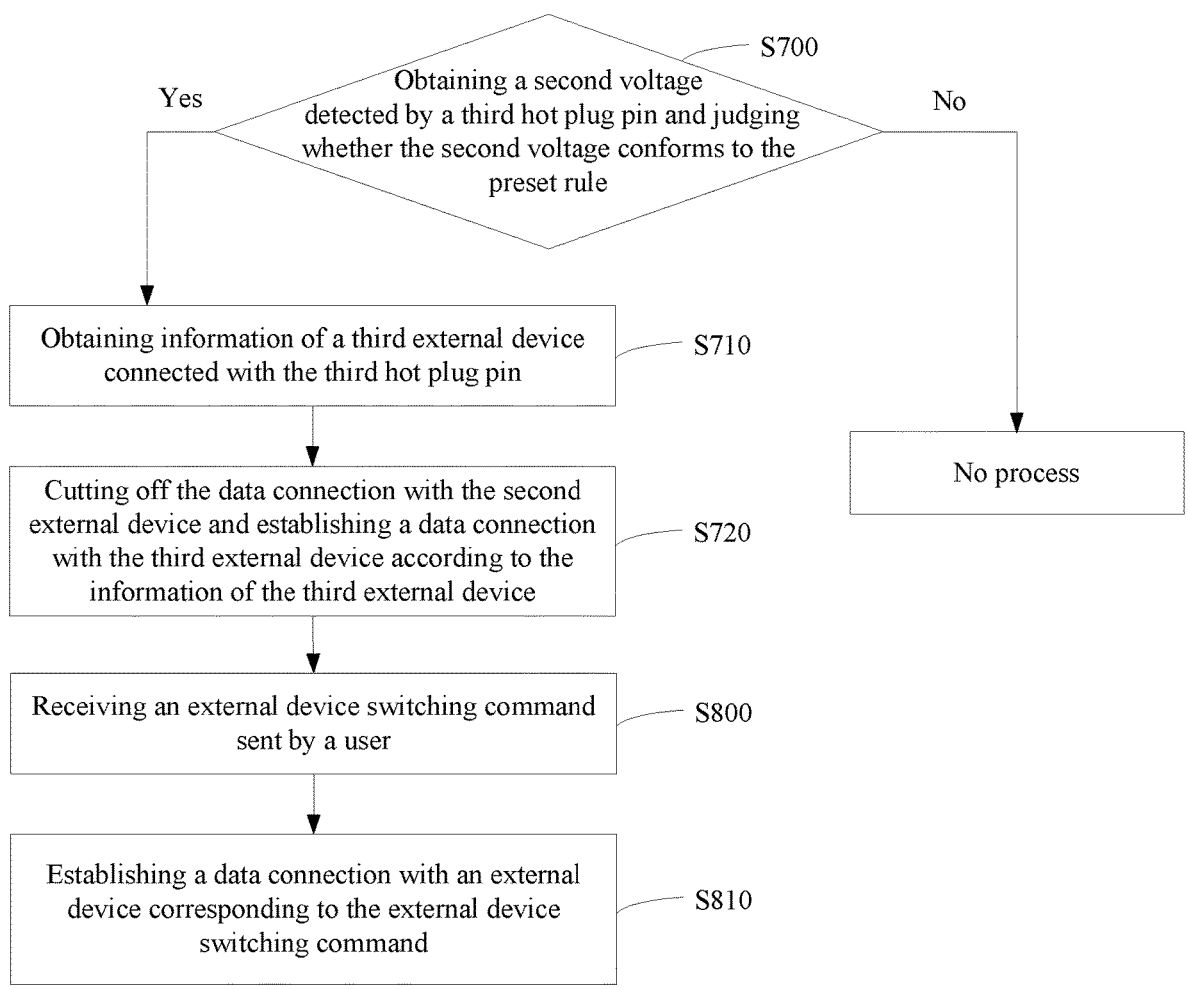
FIG. 9 is a flow diagram of an eighth embodiment of the signal channel switching method of the present application.

Referring to FIG. 9, in this embodiment, after Operation S720, the method includes:

Operation S800, receiving an external device switching command sent by a user; and Operation S810, establishing a data connection with an external device corresponding to the external device switching command.

In this embodiment, a user can send an external device switching command through a remote control key. Optionally, the user may open a preset software in the display terminal. Device names of a plurality of external devices currently connected to each HDMI interface of the display terminal are recorded in the software. An external device to be used is selected and switched by remote control, and the user manually switches after knowing the device names of the external devices, thus avoiding the problem that the user blindly switches the signal channels for many times without knowing the device names of the plurality of external devices connected with each HDMI interface, and improving the use experience of the users.

In addition, the present application also provides a storage medium on which a computer program is stored, when the computer program is executed by a processor, the operations of the signal channel switching method as described above are implemented.

The specific embodiments of the storage medium of the present application are basically the same as the embodiments of the above-mentioned signal channel switching method and will not be described here.

It should be noted that, in this article, the terms "comprising", "including" or any other variant thereof are intended to encompass non-exclusive inclusion such that a process, method, article, or system that includes a series of elements including not only those elements, but also other elements that are not explicitly listed, or also elements inherent to such a process, method, article, or system. Without further restrictions, the element defined by the statement "include a . . . " does not exclude the existence of other identical elements in the process, method, article or system that includes the element.

The above-mentioned serial numbers of embodiments of the present application are for description only and do not represent the advantages and disadvantages of the embodiments.

From the above description of embodiments, it will be apparent to those skilled in the art that the methods of the above embodiments can be implemented by means of software plus a necessary universal hardware platform, of course also by means of hardware, but in many cases the former is a better embodiment. Based on this understanding, the technical scheme of the present application can be embodied in the form of software products in essence or part that contributes to the related art. The computer software product is stored in a storage medium (e.g., a ROM/RAM, a magnetic disk, an optical disk) as described above and includes instructions to cause a terminal (which may be a mobile phone, a computer, a server, an air conditioner, a network device, etc.) to perform the methods described in various embodiments of the present application.

The above is only an exemplary embodiment of the present application and is not thus limiting the patent scope of the present application. Any equivalent structure or equivalent process transformation made by utilizing the contents of the specification and the accompanying drawings of the present application, or any direct or indirect application to other related technical fields, is likewise included in the patent scope of the present application.

What is claimed is:

1. A signal channel switching method, comprising:
   establishing a data connection with a first external device connected to a first hot plug pin, wherein the first hot plug pin is a hot plug pin of a high definition multimedia (HDMI) interface of a display terminal, and the first external device is connected to the display terminal through an HDMI wire; extended display identification data (EDID) information stored in a memory of the first external device is read by the display terminal through a data channel in the HDMI, when detecting that the EDID information of the first external device matches pre-read EDID information in the display terminal, the data connection with the first external device is established;
   delaying power-on of an HDMI interface corresponding to the second hot plug pin by a preset delay start circuit;
   obtaining a first voltage detected by a second hot plug pin, and judging whether the first voltage conforms to a preset rule, wherein the second hot plug pin is a hot plug pin of another HDMI interface of the display terminal, and judging whether the first voltage conforms to a preset rule comprises:
      judging whether the first voltage reaches a preset voltage, and
      determining that the first voltage reaches the preset voltage and judging whether a duration of the first voltage is greater than a preset time;
   determining that the duration of the first voltage is greater than the preset time and obtaining EDID information of a second external device connected with the second hot plug pin;
   analyzing the EDID information of the second external device and judging whether the EDID information of the second external device matches the pre-read EDID information; and
   if the EDID information of the second external device matches the pre-read EDID information, automatically cutting off the data connection with the first external device and establishing a data connection with the second external device according to the EDID information of the second external device;
   receiving display information sent by the second external device;
   determining an optimization rule corresponding to the EDID information of the second external device; and
   decoding the display information according to the optimization rule to generate an optimized display picture.

2. The signal channel switching method as claimed in claim 1, wherein the obtaining the first voltage detected by the second hot plug pin, and judging whether the first voltage conforms to the preset rule comprises:
   obtaining the first voltage detected by the second hot plug pin and judging whether the first voltage is higher than a first preset voltage; and
   if the first voltage is higher than the first preset voltage, recording the duration of the first voltage and judging whether the duration is greater than the preset time.

3. The signal channel switching method as claimed in claim 1, wherein, after the determining that the duration of the first voltage is greater than the preset time and obtaining information of the second external device connected to the second hot plug pin, the method further comprises:
   obtaining user setting information, and judging whether a signal channel switching is allowed according to the user setting information; and
   if the signal channel switching is allowed, executing the operation of cutting off the data connection with the first external device and establishing the data connection with the second external device according to the information of the second external device.

4. The signal channel switching method as claimed in claim 1, wherein, prior to the cutting off the data connection with the first external device and establishing the data connection with the second external device according to the information of the second external device, the method further comprises:
   judging priority orders of the first external device and the second external device according to a pre-stored priority table; and
   if the second external device takes precedence over the first external device, performing the operation of cutting off the data connection with the first external device and establishing the data connection with the second external device according to the information of the second external device.

5. The signal channel switching method as claimed in claim 1, wherein the decoding the display information according to the optimization rule to generate the optimized display picture comprises:
   obtaining a second voltage detected by a third hot plug pin, and judging whether the second voltage conforms to the preset rule;
   if the second voltage conforms to the preset rule, obtaining information of a third external device connected with the third hot plug pin; and cutting off the data connection with the second external device and establishing a data connection with the third external device according to the information of the third external device.

6. The signal channel switching method as claimed in claim 5, wherein, after the cutting off the data connection with the second external device and establishing the data connection with the third external device according to the information of the third external device, the method further comprises:
receiving an external device switching command sent by a user; and
establishing a data connection with an external device corresponding to the external device switching command.

7. A display terminal comprising a memory, a processor, and a computer program stored on the memory and executable by the processor, the processor executing the program to realize following operations:
establishing a data connection with a first external device connected to a first hot plug pin, wherein the first hot plug pin is a hot plug pin of a high definition multimedia (HDMI) interface of a display terminal, and the first external device is connected to the display terminal through an HDMI wire; extended display identification data (EDID) information stored in a memory of the first external device is read by the display terminal through a data channel in the HDMI, when detecting that the EDID information of the first external device matches pre-read EDID information in the display terminal, the data connection with the first external device is established;
delaying power-on of an HDMI interface corresponding to the second hot plug pin by a preset delay start circuit;
obtaining a first voltage detected by a second hot plug pin, and judging whether the first voltage conforms to a preset rule, wherein the second hot plug pin is a hot plug pin of another HDMI interface of the display terminal, and judging whether the first voltage conforms to a preset rule comprises:
judging whether the first voltage reaches a preset voltage, and
determining that the first voltage reaches the preset voltage and judging whether a duration of the first voltage is greater than a preset time;
determining that the duration of the first voltage is greater than the preset time and obtaining EDID information of a second external device connected with the second hot plug pin;
analyzing the EDID information of the second external device and judging whether the EDID information of the second external device matches the pre-read EDID information; and
if the EDID information of the second external device matches the pre-read EDID information, automatically cutting off the data connection with the first external device and establishing the data connection with the second external device according to the EDID information of the second external device;
receiving display information sent by the second external device;
determining an optimization rule corresponding to the EDID information of the second external device; and
decoding the display information according to the optimization rule to generate an optimized display picture.

8. The display terminal as claimed in claim 7, wherein the processor executes the program to realize following operations:
obtaining the first voltage detected by the second hot plug pin and judging whether the first voltage is higher than a first preset voltage; and
if the first voltage is higher than the first preset voltage, recording the duration of the first voltage and judging whether the duration is greater than the preset time.

9. The display terminal as claimed in claim 7, wherein, after the determining that the duration of the first voltage is greater than the preset time and obtaining information of the second external device connected to the second hot plug pin, the method further comprises:
obtaining user setting information, and judging whether a signal channel switching is allowed according to the user setting information; and
if the signal channel switching is allowed, executing the operation of cutting off the data connection with the first external device and establishing the data connection with the second external device according to the information of the second external device.

10. The display terminal as claimed in claim 7, wherein, prior to the operation of the cutting off the data connection with the first external device and establishing the data connection with the second external device according to the information of the second external device, the processor executes the program to realize following operations:
judging priority orders of the first external device and the second external device according to a pre-stored priority table; and
if the second external device takes precedence over the first external device, performing the operation of cutting off the data connection with the first external device and establishing the data connection with the second external device according to the information of the second external device.

11. The display terminal as claimed in claim 7, wherein, after the operation of the decoding the display information according to the optimization rule to generate the optimized display picture, the processor executes the program to realize following operations:
obtaining a second voltage detected by a third hot plug pin, and judging whether the second voltage conforms to the preset rule;
if the second voltage conforms to the preset rule, obtaining information of a third external device connected with the third hot plug pin; and
cutting off the data connection with the second external device and establishing a data connection with the third external device according to the information of the third external device.

12. A non-transitory computer-readable storage medium, wherein a computer program is stored thereon, when the computer program is executed by a processor, the following operations are realized:
establishing a data connection with a first external device connected to a first hot plug pin, the first hot plug pin is a hot plug pin of a high definition multimedia (HDMI) interface of a display terminal, and the first external device is connected to the display terminal through an HDMI wire; the display terminal reads extended display identification data (EDID) information stored in a memory of the first external device through a data channel in the HDMI, when detecting that the EDID information of the first external device matches pre-read EDID information in the display terminal, establishing a data connection with the first external device;

delaying power-on of an HDMI interface corresponding to the second hot plug pin by a preset delay start circuit;

obtaining a first voltage detected by a second hot plug pin, and judging whether the first voltage conforms to a preset rule, the second hot plug pin is a hot plug pin of another HDMI interface of the display terminal; wherein the preset rule is first judging whether the first voltage reaches a preset voltage, and then judging whether a duration of the first voltage is greater than a preset time if the first voltage reaches the preset voltage;

obtaining EDID information of a second external device connected with the second hot plug pin when the duration of the first voltage is greater than the preset time;

analyzing the EDID information of the second external device and judging whether the EDID information of the second external device matches the pre-read EDID information; and if the EDID information of the second external device matches the pre-read EDID information, automatically cutting off the data connection with the first external device and establishing a data connection with the second external device according to the EDID information of the second external device;

receiving display information sent by the second external device;

determining an optimization rule corresponding to the EDID information of the second external device; and decoding the display information according to the optimization rule to generate an optimized display picture.

13. The non-transitory computer-readable storage medium as claimed in claim 12, wherein when the computer program is executed by the processor, following operations are realized:

obtaining the first voltage detected by the second hot plug pin and judging whether the first voltage is higher than a first preset voltage; and if the first voltage is higher than the first preset voltage, recording the duration of the first voltage and judging whether the duration is greater than the preset time.

14. The non-transitory computer-readable storage medium as claimed in claim 12, wherein, after the determining that the duration of the first voltage is greater than the preset time and obtaining information of the second external device connected to the second hot plug pin, the method further comprises:

obtaining user setting information, and judging whether a signal channel switching is allowed according to the user setting information; and if the signal channel switching is allowed, executing the operation of cutting off the data connection with the first external device and establishing the data connection with the second external device according to the information of the second external device.

15. The non-transitory computer-readable storage medium as claimed in claim 12, wherein, prior to the operation of the cutting off the data connection with the first external device and establishing the data connection with the second external device according to the information of the second external device, when the computer program is executed by the processor, the following operations are realized:

judging priority orders of the first external device and the second external device according to a pre-stored priority table; and if the second external device takes precedence over the first external device, performing the operation of cutting off the data connection with the first external device and establishing the data connection with the second external device according to the information of the second external device.

16. The non-transitory computer-readable storage medium as claimed in claim 12, wherein, after the operation of the decoding the display information according to the optimization rule to generate the optimized display picture, when the computer program is executed by the processor, following operations are realized:

obtaining a second voltage detected by a third hot plug pin, and judging whether the second voltage conforms to the preset rule;

if the second voltage conforms to the preset rule, obtaining information of a third external device connected with the third hot plug pin; and cutting off the data connection with the second external device and establishing a data connection with the third external device according to the information of the third external device.

* * * * *